T. B. WYLIE.
APPARATUS FOR MEASURING THE FLOW OF FLUIDS.
APPLICATION FILED JUNE 5, 1911.
1,110,413.
Patented Sept. 15, 1914.
3 SHEETS—SHEET 1.
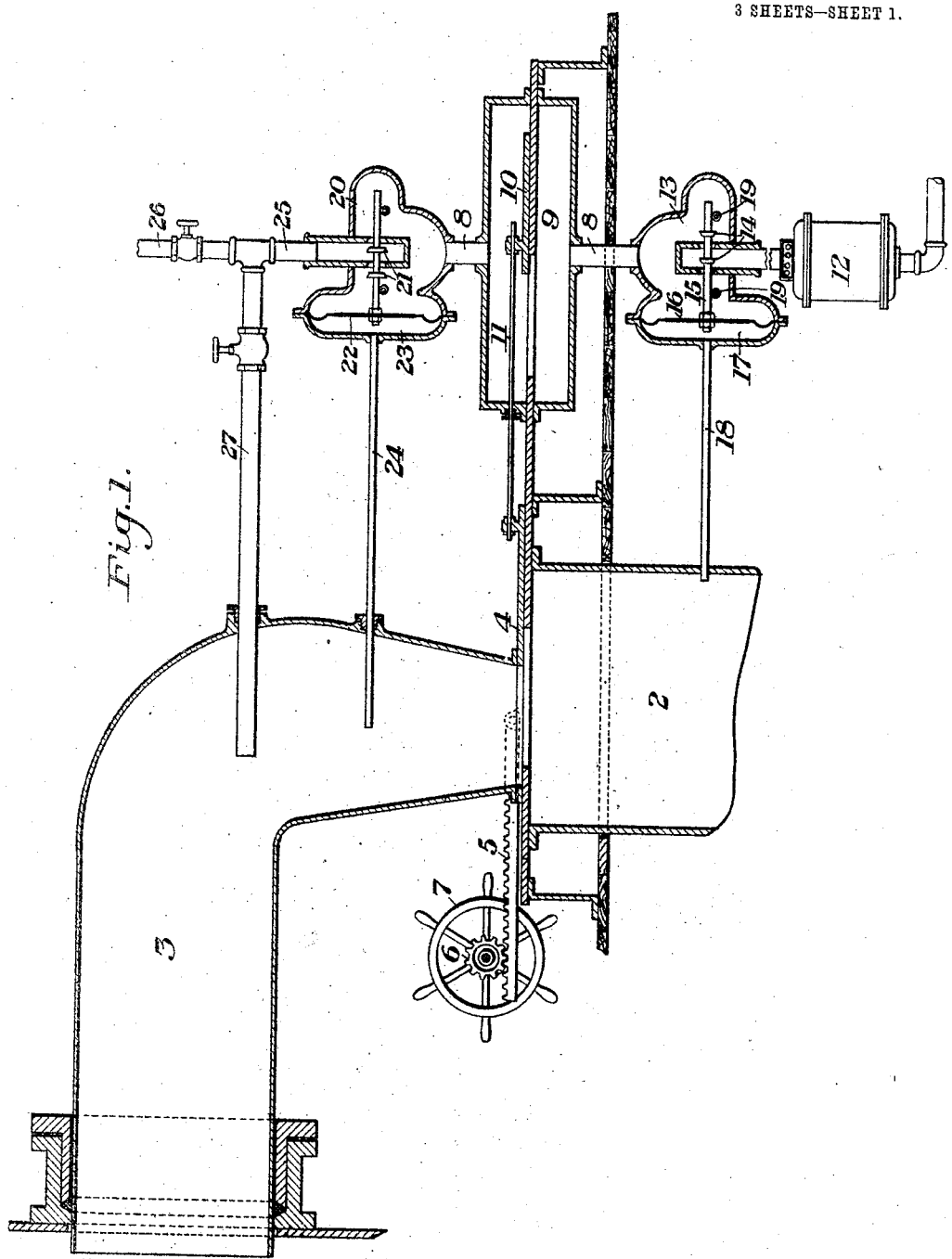
WITNESSES
INVENTOR

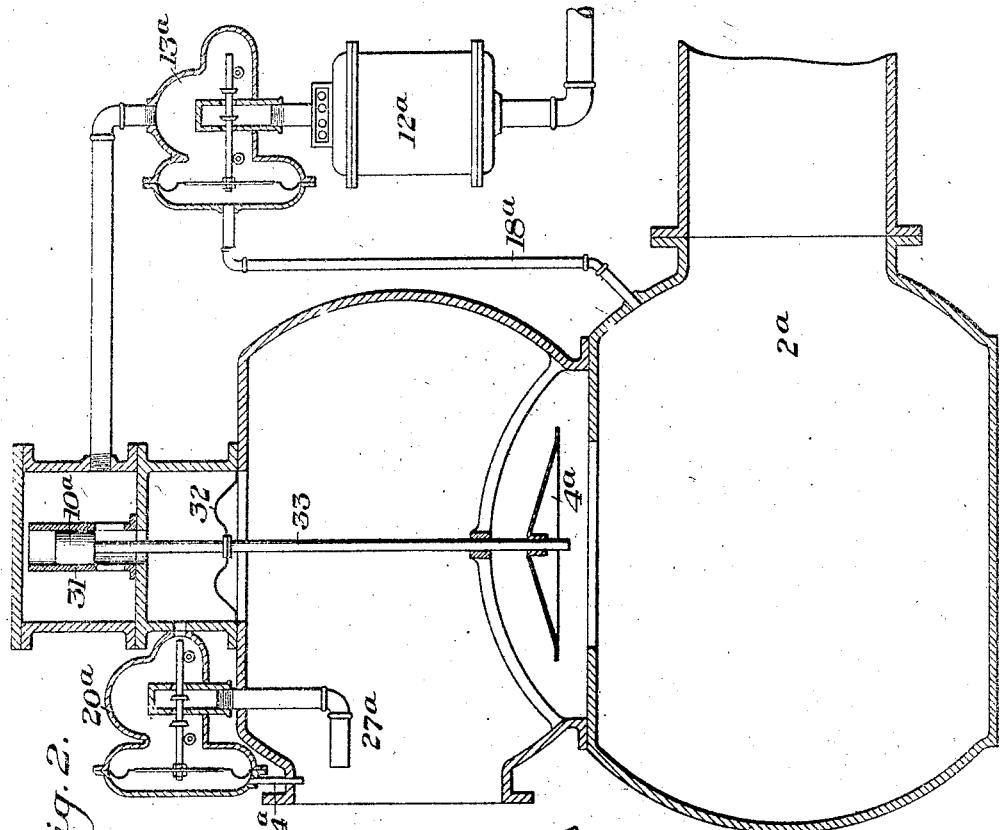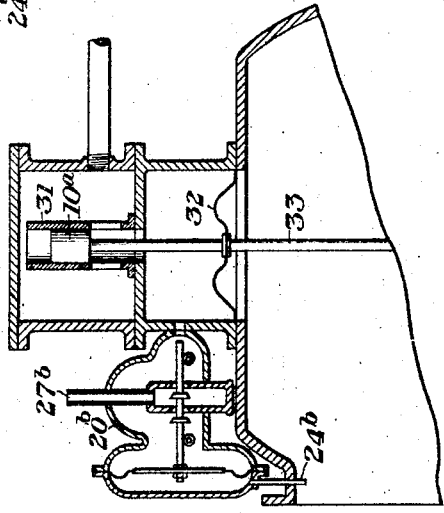

T. B. WYLIE.
APPARATUS FOR MEASURING THE FLOW OF FLUIDS.
APPLICATION FILED JUNE 5, 1911.

1,110,413.  Patented Sept. 15, 1914.
3 SHEETS—SHEET 3.

WITNESSES  
R A Balderson  
W Famariss

INVENTOR  
T. B. Wylie
by Bakewell Byrnes & Parmelee
his attys

UNITED STATES PATENT OFFICE.

THOMAS B. WYLIE, OF PITTSBURGH, PENNSYLVANIA.

APPARATUS FOR MEASURING THE FLOW OF FLUIDS.

1,110,413.  Specification of Letters Patent.  Patented Sept. 15, 1914.

Application filed June 5, 1911. Serial No. 631,489.

*To all whom it may concern:*

Be it known that I, THOMAS B. WYLIE, a resident of Pittsburgh, in the county of Allegheny and State of Pennsylvania, have invented a new and useful Improvement in Apparatus for Measuring the Flow of Fluids, of which the following is a full, clear, and exact description, reference being had to the accompanying drawings, forming part of this specification, in which—

Figure 4:
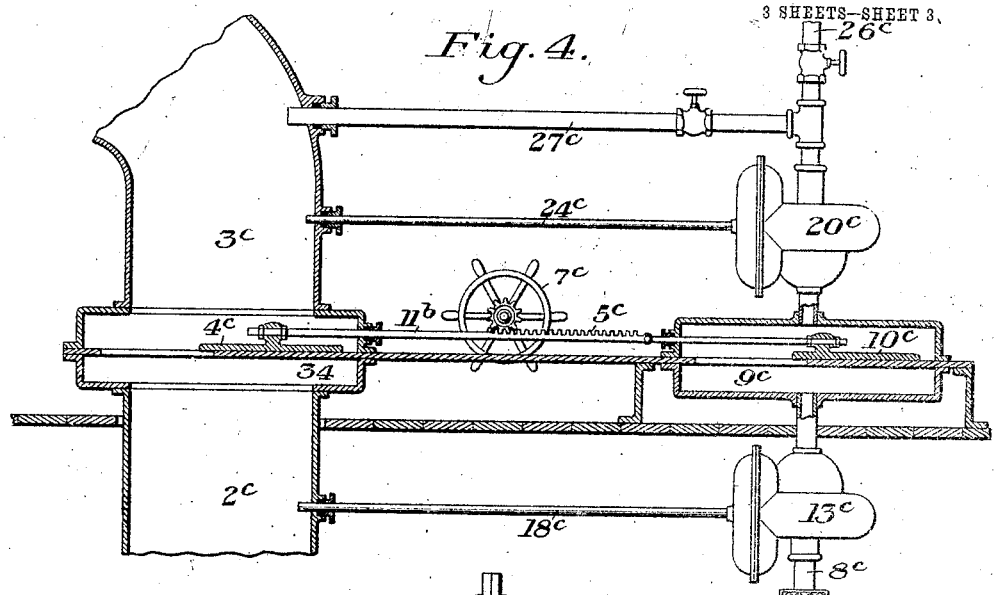
Figure 5:
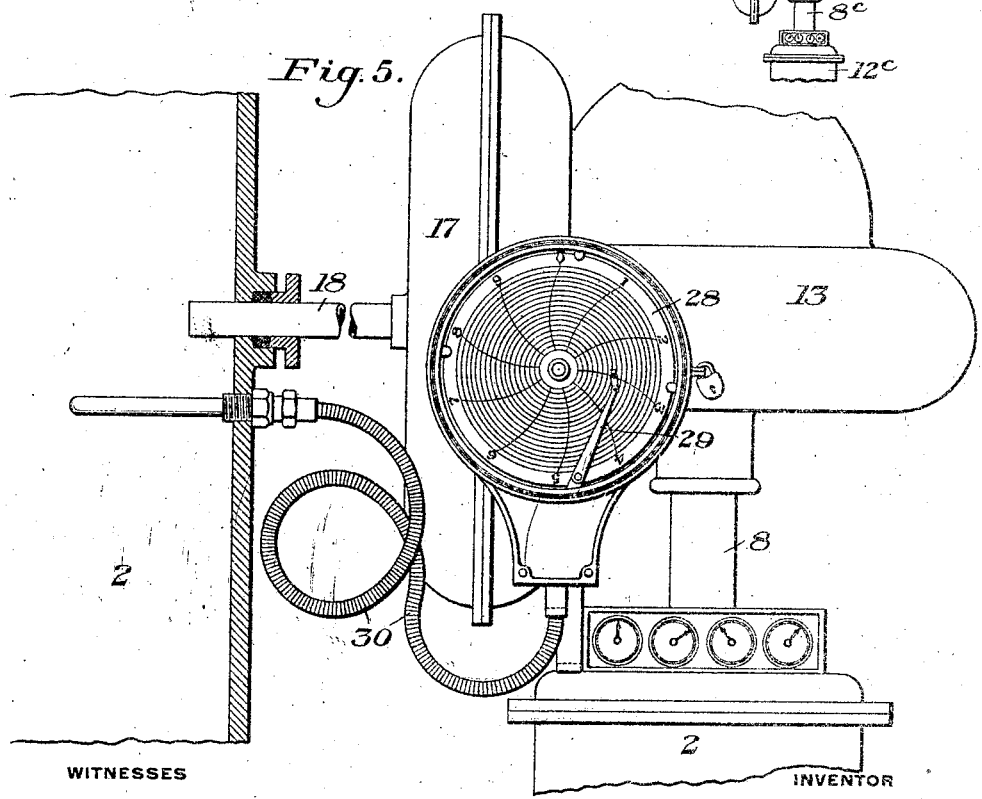

Figure 1 is a vertical section showing one form of my improved apparatus; Fig. 2 is a similar view showing a modified form; Fig. 3 is a view similar to Fig. 2, showing a slight modification; Fig. 4 is a view similar to Fig. 1, showing another form of the invention; and Fig. 5 is a sectional side elevation showing a temperature correction device which I prefer to employ with my apparatus.

My invention relates to measuring the flow of fluids passing through a conduit in cases where the condition of the fluid is such that it would injuriously affect ordinary meters or measuring devices. This condition may result from an injurious temperature of the fluid, or from other factors, such as solid matter carried by the fluid.

The invention is also applicable to measuring the flow of fluids where the conditions of the fluid are such as to pressure or otherwise that it would not properly drive an ordinary meter.

The invention consists in measuring the volume of such a fluid by measuring the volume of another independent fluid, whose volume of flow is maintained proportionate to that of the fluid to be measured.

It also consists in maintaining the proportionate flow of the two fluids by regulating devices, such as pressure plates or diaphragms, arranged to maintain the same pressure on the inlet, or the inlet and outlet sides of the control valve or throat for the fluid which is directly measured. When applied to a fluid having an injurious temperature, I also preferably employ a temperature recorder by means of which a temperature correction may be made in order to obtain the correct proportionate volumes of the two fluids.

In the drawings, in which I show preferred forms of my invention as applied to measuring a gas having an injuriously high temperature, referring to Fig. 1, 2 represents a conduit through which hot gas, as for example, the waste gas from a blast furnace, is flowing to a hot blast stove. In this case, the flow from the conduit is shown as controlled by the well known Spearman valve whose pipe or conduit member 3, forms a continuation of the conduit 2 and has a sliding valve plate 4, actuated by rack 5 and pinion 6, on a shaft-carrying hand wheel 7. Alongside the hot blast valve, I provide another conduit 8, containing a valve chamber 9, inclosing a slide valve 10. The valve 10 is connected with the valve 4 by the bar 11, extending through a stuffing box in chamber 9, so that as the valve 4 is opened or closed, the valve 10 is moved correspondingly. At the inlet side of the conduit 8 is placed a meter 12, between which and the valve chamber 9 is arranged a valve chamber 13, containing valves 14, secured to valve rod 15. The rod 15 is secured to a flexible diaphragm 16, which divides this portion of the valve chamber into two parts, the left hand chamber 17, being connected by pipe 18 with the hot blast conduit 2. The valve rod may be supported on any suitable antifriction devices. shown at 19, and the valves will be moved by the diaphragm to equalize the pressures on both sides. I also prefer to use a similar valve system on the outlet side of the chamber 9, the valve chamber being marked 20, the valves 21, and the diaphragm 22. The chamber 23 in this case is connected by pipe 24, leading into the outlet side of the hot blast valve 4. From this chamber 20 leads a pipe 25, having two valved branches 26 and 27, the pipe 27 extending into the pipe member 3 of the Spearman valve, while the pipe 26 opens to the atmosphere. In case there is a suction or partial vacuum in the pipe 3, the valve in the inlet pipe 26 is opened, and that in pipe 27 closed, so that the fluid being directly measured will pass into the conduit 3. In all other cases, the fluid being directly measured may be allowed to exhaust into the air.

In the use of this apparatus, air is passed through the meter 12 and the valve 10, when hot blast gas passes through the conduit 2. The pressures on both sides of the control valves will be equalized, thus giving a proportionate flow of the cool fluid, such as air, through the meter and valve system. Therefore, by the measuring of this other fluid the flow of hot blast gas may be measured, knowing the proportion of the volume of flow.

In order to compensate for the difference in temperatures, where the fluid to be measured has an injurious temperature, and to introduce a temperature correction, I also preferably employ a temperature recorder in connection with this system. In the form shown in Fig. 5, 28 represents the dial of a meter of the ordinary type having a chart driven by the meter, and 29 is a pointer, which is actuated by a well known type of recording thermometer, the steel capillary tube 30 of which extends into the hot blast conduit 2, so that the paper disk or chart placed on the dial will receive the combined volume and temperature record. I thus not only record the volume of the cooler proportionate fluid being measured, but also provide for a constant temperature correction by which correction the volume of hot gas flowing may be determined. This combined temperature and volume recorder is not claimed herein, as the same is covered in my copending application, Serial No. 631,490 filed June 5th, 1911.

In Fig. 2, I show a form similar to that shown in Fig. 1, except that the control valves for the flow of the two fluids are actuated by the pressures. Thus, the valve 4ª of the hot blast main 2ª will be lifted from its seat by the pressure and will actuate the piston valve 10ª movable in the slotted cylinder 31, thus opening and closing the slots which admit the fluid being directly measured. In this form, 12ª is the meter, 13ª one of the valve chambers, and 20ª the other valve chamber on the outlet side. 32 is a diaphragm connected with the stem 33 of the valve 4ª and further serving to equalize the pressures. In this form, the fluid being directly measured is admitted through pipe 27ª into the hot blast passage.

Fig. 3 shows a form similar to Fig. 2, except that the outlet pipe 27ᵇ for the fluid being directly measured opens to the atmosphere.

In Fig. 4, I show a form similar to that of Fig. 1, except that the valve 4ᶜ moves within a valve box or chamber, the rod 11ᵇ connecting the valves extending through stuffing boxes in both the chambers 34 and 9ᶜ, and being actuated by hand wheel 7ᶜ acting on rack 5ᶜ between the valve chambers.

In certain cases, such for example as measuring stack drafts, the conditions of the fluid are such as to pressure or otherwise that they will not properly drive a meter through which they are passed, even if the temperature or other conditions are proper.

The advantages of my invention will be obvious to those skilled in the art, since the invention enables the flow of fluids to be measured where either the condition of the fluid to be measured is such that it would injuriously affect a measuring apparatus, owing to injurious temperature, or the presence of foreign matter carried by the fluid, &c., or where the condition of the fluid is such as to pressure or otherwise, that it would not properly drive an ordinary meter. By causing a flow of another fluid proportionate to the flow of the fluid to be measured, and measuring the flow of this other proportional fluid, I am enabled to measure the flow of the fluid as desired without exposing the measuring devices to it. The temperature device is of importance in giving the temperature correction, where the temperature of the fluid to be measured is injurious.

Many changes may be made in the form and arrangement of the apparatus, different fluids may be employed to pass through the measuring device, and other changes may be made without departing from my invention.

I claim:

1. The method of measuring the volume of flow of a fluid, which consists in causing it to flow through a controllable opening, causing another fluid to flow through another controllable opening having its area definitely proportioned to the area of the first named opening, maintaining a difference in the pressures at opposite sides of the last named opening which is proportional to the difference in pressures at the opposite sides of the first named opening, and measuring the fluid which flows through the second opening; substantially as described.

2. Apparatus for measuring the flow of fluid, comprising a conduit for the fluid to be measured, said conduit having a restricted portion, another conduit for another fluid, two chambers which are respectively connected to the first named conduit at opposite sides of its restricted portion, a pressure plate in each of said chambers, said plates being respectively exposed on one side to the action of the pressures existing in the portions of the first named conduit to which their chambers are connected, a valve carried by one of the plates and controlling the flow of fluid through the second conduit into said chamber, a valve connected to the other plate and controlling the flow of fluid out of that chamber, a measuring opening between the two chambers, and means for measuring the flow through the second conduit; substantially as described.

3. Apparatus for measuring the flow of fluid, comprising a conduit for the fluid to be measured, said conduit having a restricted opening, another conduit for another fluid and having a measuring portion, a valve controlling said restricted opening, another valve controlling the measuring portion of the second conduit and connected to the first named valve, and means for maintaining at opposite sides of said measuring portion a difference in pressure which is proportional to the difference in pressure between opposite sides of the restricted portion of the first conduit; substantially as described.

4. Apparatus for measuring the flow of fluids, comprising a conduit for the fluid to be measured, another conduit for another fluid, a measuring device for the second fluid, connected valves to control the flow of both fluids, means for maintaining proportionate differences of pressure at opposite sides of the two valves, and a temperature recorder arranged to measure the temperature of one of the fluids; substantially as described.

In testimony whereof, I have hereunto set my hand.

T. B. WYLIE.

Witnesses:
G. M. VIERS,
H. M. CORWIN.